United States Patent [19]
Melacini et al.

[11] 3,821,178
[45] June 28, 1974

[54] PROCESS FOR THE BULK POLYMERIZATION OF ACRYLONITRILE

[75] Inventors: Paolo Melacini, Mestre; Luigi Patron; Alberto Moretti, both of Venezia; Raffaele Tedesco, Mestre, all of Italy

[73] Assignee: Montedison Fibre S.p.A., Milan, Italy

[22] Filed: May 21, 1973

[21] Appl. No.: 362,315

Related U.S. Application Data

[63] Continuation-in-part of Ser. Nos. 136,901, April 23, 1971, and Ser. No. 290,982, Sept. 21, 1972.

[30] Foreign Application Priority Data
May 23, 1972 Italy.................................. 24701/72

[52] U.S. Cl........ 260/85.5 R, 260/63 N, 260/80.81, 260/83.1, 260/88.7 D
[51] Int. Cl....... C08f 3/76, C08f 15/02, C08f 15/22
[58] Field of Search...... 260/85.5 R, 85.5 F, 88.7 R, 260/88.7 D

[56] References Cited
UNITED STATES PATENTS
3,306,888  2/1967  Mortimer...................... 260/85.5 F

*Primary Examiner*—Harry Wong, Jr.
*Attorney, Agent, or Firm*—Myron Cohen

[57] ABSTRACT

Free-radical bulk polymerization of acrylonitrile with or without another copolymerizable ethylenically unsaturated monomer, using 2,2'-azo-bis(2-methyl-4-methyl-4-methoxy-valeronitrile) as a free-radical catalytic system having a decomposition rate constant ($K_d$) greater than 1 hr.$^{-1}$ at the polymerization temperature, a reaction time (Q) sufficient to semi-decompose the catalyst, and a catalyst concentration $(C)_o$ equal to or greater than $Q \times 2 \times 10^{-3}$ moles/liter, wherein "Q" is the residence time expressed in hours.

4 Claims, No Drawings

3,821,178

PROCESS FOR THE BULK POLYMERIZATION OF ACRYLONITRILE

CROSS-REFERENCE TO RELATED APPLICATION

This application is a continuation-in-part of our co-pending applications, Ser. No. 136,901, filed Apr. 23, 1971 and Ser. No. 290,982, filed Sept. 21, 1972, the contents of both said applications being expressly incorporated herein by reference.

BACKGROUND OF THE INVENTION

1. Field of the Invention

The present invention relates to a process for the bulk polymerization of acrylonitrile, either alone or together with ethylenically unsaturated co-monomers copolymerizable therewith. More particularly, the present invention concerns an improved process for free-radical bulk polymerization of acrylonitrile which process provides a high degree of control of the reaction conditions and the reaction mixture viscosity and results in high polymerization conversions.

2. Description of the Prior Art

Heretofore, the free-radical bulk polymerization of acrylonitrile at room temperature or higher temperatures has not been an industrially feasible process.

Primarily, this has been due to the difficulty of (1) finding a catalytic system which is soluble in the monomer and capable of achieving a high degree of efficiency together with easy control of the polymerization reaction, and (2) of finding reaction conditions suitable to maintain the polymerization mixture in a sufficiently fluid state to facilitate mixing the reaction medium and dissipation of the heat generated by the reaction.

Thus, it is well known that the bulk polymerization of acrylonitrile, under certain conditions, can become aut-catalytic, which can lead to loss of control of the polymerization and explosions due to the rapid development of hot spots. The self-catalytic course of this type of reaction is due to the reduction of the rate of chain-termination of the macroradicals resulting from their being trapped in the precipitate polymer. (See W. H. Thomas in "Mechanism of Acrylonitrile Polymerization" — Fortschritte der Hochpolymeren-Forschung, 2nd volume, pages 401–411, 1961.)

The extent of this phenomenon, referred to in the literature as the "gel effect," depends on the degree of swelling of the polymer in the reaction medium and, thus, on its apparent density. Inasmuch as, during the polymerization, the polymerization medium rapidly thickens due to the adsorption of the monomer into the polymer, it becomes increasingly difficult to stir the mixture and dissipate the heat of the reaction. Consequently, the increase of polymerization rate, combined with the contemporaneous increase in viscosity of the polymerization medium, causes the temperature to rise, which in turn further increases the reaction rate. Thus, the polymerization gradually gets out of control and often results in an explosion.

It is known that this catalytic effect of the precipitated polymer on the polymerization rate increases proportionally with the concentration of the catalyst. (See C. H. Bamford, W. C. Barb, A. D. Jenkins, and P. F. Onyon — "The Kinetics of Vinyl Polymerization by Radical Mechanism" — Butterworts 1958, page 113).

Kinetically expressed, the polymerization rate ($R_p$) is dependent on the concentration (C) of the catalyst according to the equation:

$$R_p = K(C)^\alpha$$

wherein, K is a constant, while $\alpha$ ranges from 0.7 to 0.9, instead of being equal to 0.5 as in the case of non self-catalytic polymerizations. (See C. H. Bamford, W. G. Barb, A. D. Jenkins, and P. F. Onyon — Supra, and C. H. Bamford, and A. D. Jenkins, and P. F. Onyon — Supra, and C. H. Bamford, and A. D. Jenkins, Proc. Roy. Soc., London, Ser. A. 216,515, 1953).

In the bulk polymerization of acrylonitrile catalized by benzoyl peroxide or azo-bis-iso-butyronitrile, values for $\alpha$ of 0.75 and 0.82, respectively, have been observed. (See W. M. Thomas, J. Polymer Sci., n. 13, page 329, 1954). These values indicate the self-catalytic nature of the polymerization reaction.

To date, the industrial scale bulk polymerization of acrylonitrile has been considered unfeasible because the process could be controlled only at low initiation rates and with small quantities of reaction monomer. (See W. H. Thomas, "Mechanism of Acrylonitrile Polymerization" — Fortschritte der Hochpolymeren-Forschung, volume 2, page 410, 1961).

As is evident from the foregoing, the temperature of such processes must be controlled by the continuous removal of the polymerization heat. For this purpose it is necessary, especially when large reactors are used, to maintain the viscosity of the polymerization medium at low levels. That is to say, it is necessary to operate under such conditions as to minimize the amount of monomer absorbed by the polymer.

Although it is recognized that in order to minimize the monomer adsorption the polymer must possess a compact structure, generally accompanied by a high apparent density, methods for accomplishing this, particularly on an industrial scale, have not been available.

SUMMARY OF THE INVENTION

The present invention provides an improvement upon the inventions described and claimed in copending applications, Ser. Nos. 136,901 and 290,982.

According to said copending applications, the process of which the present invention is an improvement comprises:

a. Polymerizing acrylonitrile, either alone or in admixture with up to about 50 mole % of at least one other copolymerizable ethylenically unsaturated monomer, according to a continuous or a semi-continuous polymerization procedure;

b. using a free-radical catalytic system having a decomposition rate constant ($K_d$) greater than 1 hr.$^{-1}$ at the polymerization temperature;

c. using a reaction or residence time (Q) at least sufficient to semi-decompose the catalyst; and d. using a catalyst concentration $(C)_o$ at least equal to $2 \times 10^{-3} Q$ moles/liter, wherein "Q" is the reaction or residence time expressed in hours.

By the term "semi-continuous method" is intended a polymerization carried out by a continuous feed of the reactants over a definite interval of time without continuously discharging the polymerization mixture. The continuous polymerization is carried out by continuously adding the reactants to a well stirred reactor, so as to assure a homogeneous composition, and simultaneously discharging the reaction mixture over an indefinite interval of time (see Stanley Walas, Reaction Kinetics for Chemical Engineers, — McGraw-Hill, 1959, pages 79–100).

As described in the above-cited copending applications, examples of suitable radical catalysts having a high decomposition rate constant which are useful for the bulk polymerization of acrylonitrile, are: tert. butyl-phenyl-dimethyl-peracetate, phenyl-acetyl-peroxide, tert. butyl-2-(phenylthio)-perbenzoate, catalytic systems based on an organic hydroperoxide and an oxidizable sulphoxy compound such as: cumeme hydroperoxide, tert.butyl-hydroperoxide or cyclohexanone-hydroperoxide, and sulphur dioxide combined with a nucleophilic compound such as water, methyl alcohol, ethyl alcohol and higher alcohols; or cumene-hydroperoxide or other organic hydroperoxides and a mono-ester of sulphurous acid of the general formula:

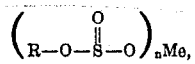

Wherein R is an alkyl, cyclo-alkyl, aryl or alkylaryl group having from one to 12 carbon atoms; Me is a metal of the first or second group of the Periodic System or an ammonium group or aluminum, and $n$ is equal to 1, 2 or 3, depending on the valency of Me; or cumene-hydroperoxide or other organic hydroperoxides, a magnesium alcoholate and a dialkyl-sulphite of the general formula:

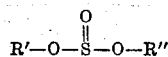

wherein R' and R'' may be the same as or different from one another, and are either a straight or a branched chain substituted or unsubstituted alkyl radical, or a cyclo-alkyl radical having from one to 12 carbon atoms.

According to the present invention, it has now been found that whiter and more heat-resistant acrylonitrile polymers or copolymers may be obtained at high polymerization conversions by carrying out the polymerization in the presence of the thermal catalyst 2,2'-azo-bis(2-methyl-4-methyl-4-methoxy-valeronitrile) having the formula:

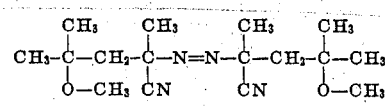

This catalyst has a decomposition rate constant ($K_d$) of 3.6 h$^{-1}$ at 60°C, and thus meets the requirements of the catalyst set forth above. This decomposition rate constant (Kd) was determined using the method described in the above-mentioned copending applications. As mentioned above, the concentration of the catalyst depends on the reaction time, that is, the concentration must be at least $2 \times 10^{-3}xQ$ moles/liter, wherein Q is the reaction or residence time expressed in hours.

Any concentration greater than this may be used, although in practice, concentrations greater than 3 percent by weight with respect to the monomer or mixture of monomers are not advisable.

The polymerization may be conducted either continuously or semi-continuously, at a temperature between about 50°C and 80°C, which is the boiling temperature of the monomer or monomer mixture.

The selected polymerization temperature may be controlled by conventional means, such as, for example, by immersing the reactor into a thermostatic bath or by circulating a cooling fluid around the walls or through cooling coils inside the reactor, or by removing the heat of reaction by evaporating the reaction medium itself.

It is preferred to carry out the polymerization in the absence of oxygen, which has an inhibiting effect on the polymerization.

Among the ethylenically unsaturated monomers co-polymerizable with acrylonitrile, there are included, for example, alkyl-acrylates, aryl-acrylates, and cycloalky-acrylates such as: methylacrylate, ethylacrylate, isobutylacrylate, etc.; alkyl-methacrylates, aryl-methacrylates, and cycloalkyl-methacrylates such as: methyl-methacrylate, ethyl-methacrylate, butyl-methacrylate, etc.; unsaturated ketones, vinyl esters such as: vinyl-acetate, vinyl-propionate, etc.; vinyl-ethers, styrene and alkyl derivatives thereof, vinyl chloride, vinylidene chloride, vinyl fluoride, methacrylonitrile, butadiene and the like. In addition, the ethylenically unsaturated monomers disclosed in the above-mentioned copending applications may also be used.

The polymerization may be carried out in the presence of chain transfer agents such as the alkyl mercaptans which also have fluidizing effects, as well as in the presence of inert organic compounds which exert a diluent action on the reaction mass. Examples of these are: saturated hydrocarbons, halogenated saturated hydrocarbons, etc.

The process according to the invention enables the production of acrylonitrile polymers and copolymers which, in addition to having an apparent density considerably greater than that of the polymers obtained according to the emulsion and suspension polymerization processes, show improved chemical-physical properties and more particularly they have a whiter original color.

The original color of the obtained polymers is determined by means of a General Electric Spectrophotometer Integrator, according to the C.I.E. representation and measurement method for colors.

According to this system the color is expressed in terms of purity index (PI) which corresponds to 100P, wherein P is the purity, and as the brightness (B). (See: Hardy — HANDBOOK OF COLORIMETRY - Massachusetts Institute of Technology — 1936).

DESCRIPTION OF THE PREFERRED EMBODIMENTS

The following examples are given to more clearly illustrate the invention.

EXAMPLE 1

A 2000 cc polymerization reactor provided with a stirrer, an overflow pipe, a cooling system and a thermometer, was preloaded to half of its volume with a mixture of monomers consisting of 80 percent of acrylonitrile and 20 percent of vinyl acetate (water content = 280 ppm), and heated at a temperature of 70°C. into the reactor there were continuously fed;

4g /hour of 2,2'-azo-bis(2-methyl-4-methyl-4-methoxy-valeronitrile) and

2g /hour of mercaptoethanol.

After the first 30 minutes, the mixture of monomers was fed into the reactor at a flow rate of 2000 g/hour.

After a further 30 minutes, the polymerization suspension started to discharge through the overflow pipe.

The polymerization conversion amounted to 40 percent and the copolymer, collected at steady state conditions, was filtered, washed with water and dried for 24 hours at 60°. The polymer had the following characteristics:

| | |
|---|---|
| intrinsic viscosity (determined in a solution of dimethyl-formamide at 25°C) | 1.0 dl/g |
| copolymerized vinyl acetate | 7.5 % by weight |
| original color | PI = 99.3 |
| | B = 96.2 |

Example 2

Operating according to the conditions described in Example 1, the following substances were continuously fed into the reactor: 0.1 g/hour of 2,2'azo-bis(2-methyl-4-methyl-4-methoxy-valeronitrile) and 2 g/hr of mercaptoethanol.

The polymerization conversion amounted to 25 percent and the obtained copolymer had the following characteristics:

| | |
|---|---|
| intrinsic viscosity | 1.4 dl/g |
| copolymerized vinyl-acetate | 7 % by weight |
| original color | PI = 99.5 |
| | B = 96.2 |

EXAMPLE 3

Operating according to the conditions described in Example 1, 3 g/hour of 2,2'-azo-bis(2-methyl-4 methyl-4 methoxy valeronitrile) were continuously fed into the reactor pre-loaded to half of its volume with a mixture of monomers consisting of 93 percent of acrylonitrile and 7 percent of methacrylonitrile.

The polymerization conversion amounted to 35 percent and the obtained copolymer had the following characteristics:

| | |
|---|---|
| intrinsic viscosity | = 2.0 dl/g |
| copolymerized methacrylonitrile | = 6 % by weight |
| original color | PI = 99.7 |
| | B = 96.5 |

EXMPLE 4

Operating according to the conditions described in Example 1, into the reactor pre-loaded to half of its volume with acrylonitrile (water content 0.3 % by weight), the following substances were continuously fed:

0.2 g/hour of 2,2'-azo-bis(2-methyl-4-methyl-4methoxy valeronitrile) and 8 g/hour of mercaptoethanol.

After the first 15 minutes, the acrylonitrile was fed into the reactor at a flow rate of 4000 g/hour.

The polymerization conversion amounted to 38 percent and the obtained polymer had the following characteristics:

| | |
|---|---|
| intrinsic viscosity | = 1.6 dl/g |
| original color | PI = 99.6 |
| | B = 96.4 |

EXAMPLE 5

Operating according to the conditions described in Example 4, 4 g/hour of 2,2'-azo-bis(2 methyl-4-methyl-4 methoxy valeronitrile) and 4 g/hour of mercaptoethanol were continuously fed into the reactor pre-loaded to half of its volume with a mixture of monomers consisting of 91 percent of acrylonitrile and 9 percent of methyl-acrylate.

The polymerization conversion amounted to 35 percent and the obtained copolymer had the following characteristics:

| | |
|---|---|
| intrinsic viscosity | = 1.6 dl/g |
| copolymerized methyl-acrylate | = 8 % by weight |
| original color | PI = 99.5 |
| | B = 96.4 |

EXAMPLE 6

A 2000 cc. polymerization reactor provided with a stirrer, an overflow pipe, a cooling system, a thermometer and a reflux condenser, was pre-loaded to half of its volume with a mixture of monomers consisting of 76 percent of acrylonitrile, 16 percent of vinyl acetate and 8 percent of vinyl bromide (water content of the mixture = 0.3 percent by weight) and heated at a temperature of 67°C. Into the reactor there were continuously fed 4 g/hour of 2,2'-azo-bis(2-methyl-4-methyl-4-methoxy-valeronitrile).

After the first 30 minutes, the mixture of monomers was fed into the reactor at a flow rate of 2000 g/hour.

The polymerization conversion amounted to 40 percent and the copolymer showed the following characteristics:

| | |
|---|---|
| intrinsic viscosity | 1.7 dl/g |
| copolymerized vinylacetate | 6.9 % by weight |
| copolymerized vinyl bromide | 4.6 % by weight |
| original color | PI = 99.2 |
| | B = 96.1 |

Variations can, of course, be made without departing from the spirit and scope of the invention.

Having thus described the invention, what we desire to secure by Letters Patent and hereby claim is:

1. In a process for the bulk polymerization of acrylonitrile or a mixture of acrylonitrile with up to about 50 mol % of at least one other ethylenically unsaturated monomer copolymerizable therewith, which comprises carrying out the polymerization using a. a continuous or semi-continuous polymerization procedure;

b. a free-radical catalytic system having a decomposition rate constant ($K_d$) greater than 1 hr.$^{-1}$ at the polymerization temperature:

c. a residence time (Q) at least sufficient to half decompose the catalyst; and d. a catalyst concentration $(C)_o$ at least equal to 2 × $10^{-3}$ × Q moles/liter, wherein "Q" is the reaction or residence time in hours; an improvement according to which the catalyst is 2,2'-azo-bis(2-methyl-4-methyl-4-methoxy-valeronitrile).

2. A process according to claim 1, wherein the concentration of the catalyst is not greater than 3 percent by weight based on the total weight of the monomers.

3. A process according to claim 1 wherein the polymerization temperature is between about 50° and 80°C.

4. A process according to claim 2, wherein the polymerization temperature is between about 50° and 80° C.

* * * * *

UNITED STATES PATENT OFFICE
CERTIFICATE OF CORRECTION

Patent No. 3,821,178      Dated June 28, 1974

Inventor(s) Paolo Melacini et al.

It is certified that error appears in the above-identified patent and that said Letters Patent are hereby corrected as shown below:

Title page, left side, under "Foreign Application Priority Data"; "24701/72" should read -- 24701 A/72 --.

Signed and sealed this 4th day of February 1975.

(SEAL)
Attest:

McCOY M. GIBSON JR.
Attesting Officer

C. MARSHALL DANN
Commissioner of Patents